(12) United States Patent  (10) Patent No.: US 8,758,208 B2
Mayr et al.  (45) Date of Patent: Jun. 24, 2014

(54) TOOL HANDLING DEVICE FOR MACHINE TOOLS

(75) Inventors: Matthias Mayr, Füssen (DE); Michael Trenkle, Pfronten (DE); Hans Gronbach, Eisenberg (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 284 days.

(21) Appl. No.: 13/438,772

(22) Filed: Apr. 3, 2012

(65) Prior Publication Data

US 2013/0095988 A1  Apr. 18, 2013

(30) Foreign Application Priority Data

Apr. 5, 2011  (DE) .......................... 10 2011 006 811

(51) Int. Cl.
 *B23Q 3/157*  (2006.01)
 *B23Q 3/155*  (2006.01)
(52) U.S. Cl.
 CPC .......... *B23Q 3/1554* (2013.01); *B23Q 3/15766* (2013.01)
 USPC ............. 483/46; 483/44; 483/49; 414/226.01
(58) Field of Classification Search
 CPC ............. B23Q 3/15513; B23Q 3/1554; B23Q 3/1556; B23Q 3/15573; B23Q 3/157; B23Q 1/15766
 USPC ........... 483/39, 40, 41, 45, 46, 48, 49, 51, 52, 483/53; 414/225.01, 226.01
 See application file for complete search history.

(56) References Cited

U.S. PATENT DOCUMENTS

| 8,425,386 B2 | 4/2013 | Tüllmann et al. |
| 2006/0111222 A1 | 5/2006 | Yasui |
| 2010/0173762 A1 | 7/2010 | Tullman et al. |

FOREIGN PATENT DOCUMENTS

| DE | 8624943 U1 | 10/1986 |
| DE | 202007014796 U1 * | 1/2008 |
| EP | 1754565 A1 | 2/2007 |
| JP | 6279934 A | 4/1987 |
| WO | 0058059 A1 | 10/2000 |
| WO | WO 2010123135 A1 * | 10/2010 |

OTHER PUBLICATIONS

EPO Search Report (12002213.2) dated May 16, 2013; 5 pages.

* cited by examiner

*Primary Examiner* — Erica E Cadugan
*Assistant Examiner* — Michael Vitale
(74) *Attorney, Agent, or Firm* — The Maxham Firm

(57) ABSTRACT

A tool handling device for machine tools, comprising a tool magazine having a transfer position for the transfer of the tools, including a tool changer movable between the transfer position and an exchange position, which has a rotatable double gripper, and a supporting structure movable on a foundation, on which the tool changer is mounted. In order to achieve fast tool changes in tight spaces on the machine, the supporting structure has an upper slide and a lower slide which can both be displaced by means of spindle drives in the same direction on a foundation, wherein a single drive motor is provided for driving the two spindle drives.

9 Claims, 3 Drawing Sheets

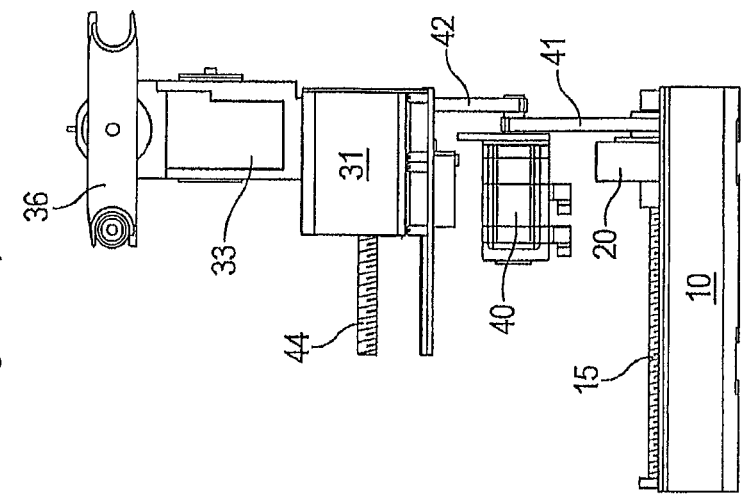
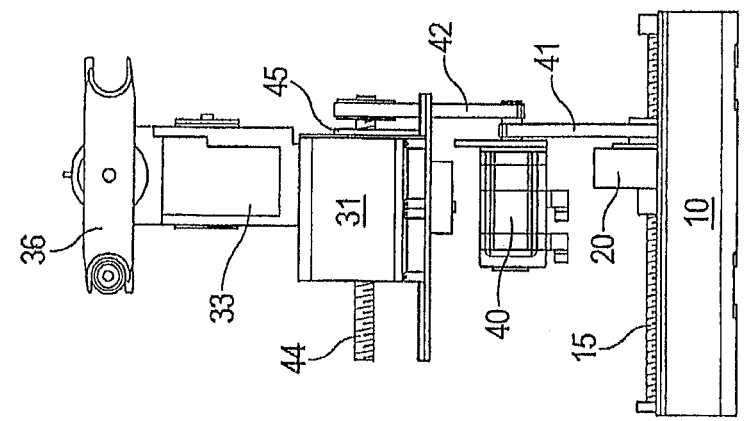
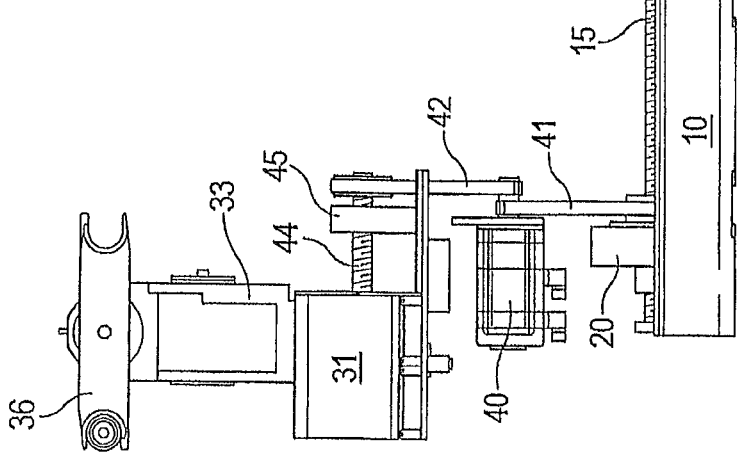

TOOL HANDLING DEVICE FOR MACHINE TOOLS

FIELD OF INVENTION

The disclosed concept relates to a tool handling device for machine tools and includes a tool changer movable between a transfer position and an exchange position of the machine tool, and a supporting structure displaceable on a foundation, on which the tool changer is mounted.

BACKGROUND OF THE INVENTION

A tool handling device for machine tools is known from German patent publication DE 10 2008 059 422, which has a tool changer including a rotatable tool double gripper that is mounted on the end of a supporting column that can be lifted and lowered and rotated about a longitudinal axis. A mechanical cam gear that has a single drive motor, a cam barrel, and intermediate gearing serves for generating the lifting and rotating movements of the tool double gripper. The cam barrel has a tappet for the rotational drive of the tool double gripper on its upper front. A cam curve is prepared on the peripheral surface of the cam barrel for the lifting movement of the tool double gripper. The supporting column of the tool double gripper, the cam barrel, and the intermediate gearing are accommodated in a housing-like slide that can be displaced on a foundation by means of a motor spindle drive. As the axes of the cam barrel, the Maltese wheel, the intermediate gearing, and the supporting column are successively arranged, the slide has a narrow width so that it occupies a correspondingly small space. However, this known handling device is technically extensive due, for example, to the required intermediate gearing with a Maltese cross drive and both the vertical and rotating motion sequences of the double gripper, the maximally possible travel distance of the device being restricted.

SUMMARY OF EMBODIMENTS OF THE INVENTION

It is a purpose of the invention embodiments to provide a tool handling device for machine tools which is designed to be technically simple and which, in addition to little required space, enables sufficiently long travel distances for the tool changer.

This benefit is achieved by the facts that the supporting structure has two slides that are arranged on top of each other and can be displaced in the same direction, that a respective linear drive is mounted on each of the two slides, and that the two linear drives are driven by common motor, whereby a telescopic overall movement of the tool changer between the transfer position on the tool magazine and the exchange position on the work spindle is achieved.

A benefit of the concept is the fact that an additional handling apparatus used as a rule in the prior art, which takes the individual tools from the magazine and hands them over into a correspondingly positioned tool changer, is not necessary, so that the sequence of operations accelerates and the technology becomes simpler. The coaxial orientation and the preferably synchronous movability of the two slides achieves a long travel distance for the tool changer so that larger intermediate distances between the magazine and the exchange position of the work spindle can be bridged without the necessity of an additional transfer apparatus. This particularly applies to the case where the maximally possible travel distance of the lower slide is shorter than the necessary travel route. The maximally possible travel distance is sufficiently elongated by the additional distance of the upper slide.

According to a suitable design of the device the two linear drives for the travel movements of the two slides are spindle drives which are suitably coupled to the only drive motor disposed between the two spindle drives via two belt drives.

The threaded spindles of the two spindle drives are preferably parallel to each other and arranged at different heights in the supporting structure, which leads to a particularly narrow configuration and a technically simple type of drive. Here, the one threaded spindle is suitably coupled via the spindle nut thereof and the other threaded spindle is coupled via the spindle itself to the drive motor, suitably via continuous V-belts or toothed belts. A favorable arrangement for the two belt drives with small required space results if the drive motor is disposed in the supporting structure at a medium height between the two threaded spindles.

According to another preferred embodiment, the lower slide driven by the lower spindle drive is supported on a transversely movable foundation via two guiding rails. On this lower slide two guiding rails are mounted that are aligned in the longitudinal direction thereof, on which the upper slide can be displaced together with the tool changer by means of the upper spindle drive.

BRIEF DESCRIPTION OF THE DRAWING

The objects, advantages, features, and other desirable characteristics of embodiments of the invention can be readily perceived from the following detailed description and attached drawing, in which:

FIG. 3a is a schematic elevation view of the tool handling device of FIG. 2 in a left end position;

FIG. 3b is a schematic elevation view of the tool handling device of FIG. 2 in an intermediate position; and FIG. 3c is a schematic elevation view of the tool handling device of FIG. 2 in a right end position.

DETAILED DESCRIPTION OF EMBODIMENTS OF THE INVENTION

Figure 1:
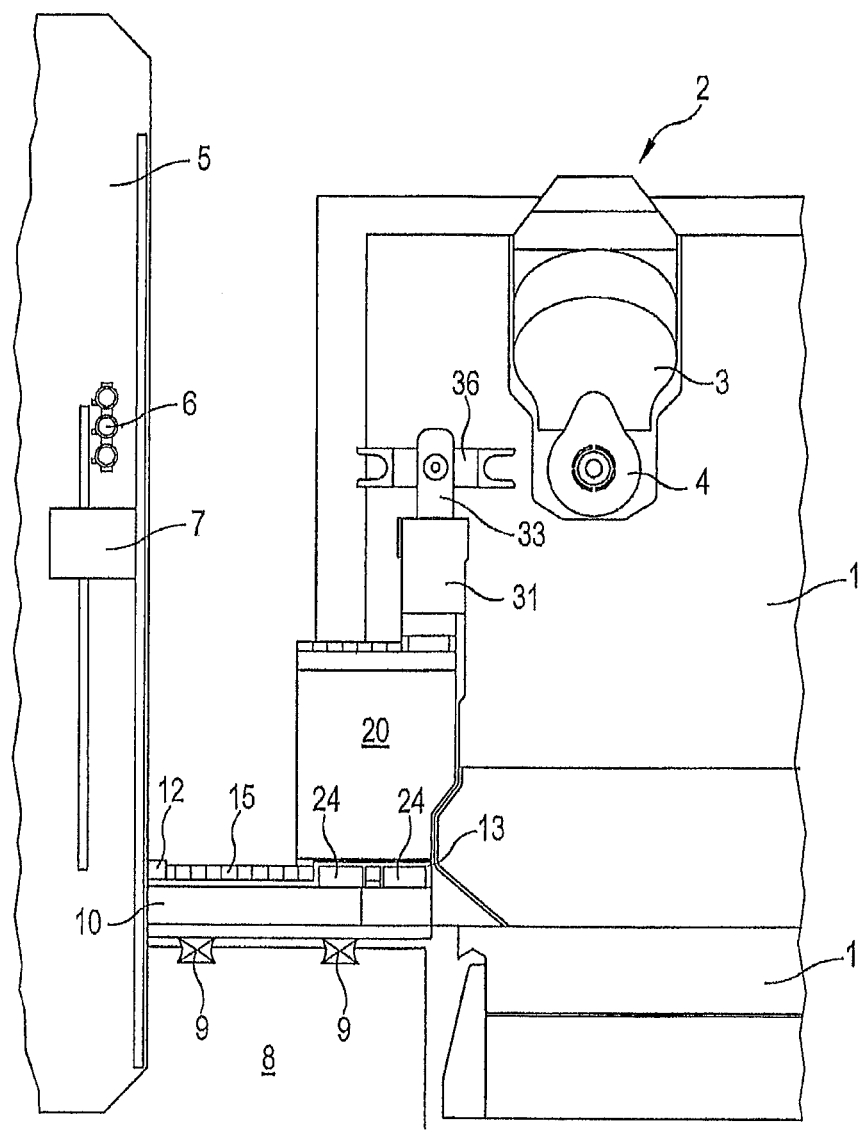
FIG. 1 is a schematic front view of a machine tool comprising a swivel milling head and a tool handling device according to an embodiment of the invention.

FIG. 1 schematically illustrates a numerically controlled (NC) milling machine having machine frame 1 and machining unit 2 that can be displaced in a plurality of coordinate axes. This machining unit has a relatively heavy rotary swivel head 3 in which a swiveling work spindle 4 having an installed drive motor (not shown) is supported. In the position as shown work spindle 4 is oriented horizontally. Tool magazine 5 is provided at the side of the milling machine. This tool magazine is formed as a vertical chain magazine including tool holders 6 and transfer position 7 for the individual tools.

Figure 2:
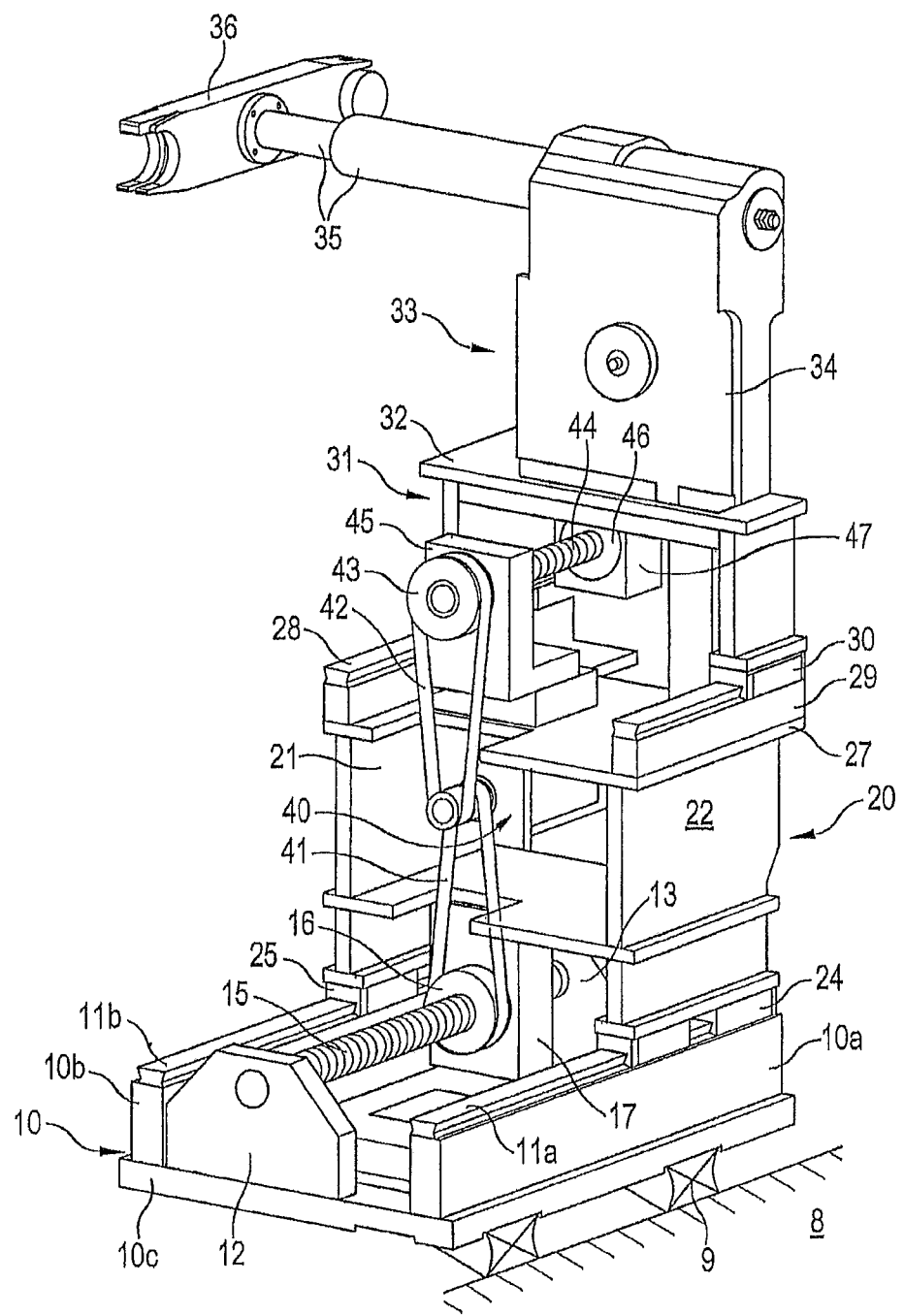
FIG. 2 is a schematic perspective view of the tool handling device of FIG. 1.

Foundation 10 can be displaced in a direction perpendicular to the drawing plane of FIG. 1 in guiding rails 9 on base 8. As can be taken from FIG. 2, this foundation has two spaced parallel side walls 10a, 10b and continuous bottom plate 10c. Guiding rails 11a, 11b are fixed to the respective upper surfaces of side walls 10a, 10b. Respective bearing blocks 12, 13 are fixedly mounted to the respective front and rear ends of bottom plate 10c, in which a respective bearing arrangement for a threaded spindle 15 is disposed that is aligned horizontally and in parallel to the two guiding rails. Spindle nut 16 is borne on threaded spindle 15, which is firmly connected to a vertical, in this case rectangular, supporting plate 17 via a flange. By a rotary movement of threaded spindle 15, which is stationary in the longitudinal direction, spindle nut 16 and thus supporting plate 17 are displaced in the longitudinal direction of the spindle. In FIGS. 1 and 2 spindle nut 16 and supporting plate 17 are in their rear end positions, corresponding to FIG. 3*c*, in which a tool is changed into the work spindle 4.

Supporting plate 17 is fixedly connected to stable plate construction 20 which is assembled from a plurality of dimensionally stable vertical and horizontal plates. The two side walls 21, 22 of plate construction 20 are displaceably supported on guiding rails 11*a*, 11*b* of foundation 10 via shoes 24, 25. Two mutually parallel bars having guiding rails 28, 29 are mounted to upper supporting plate 27 on which guiding shoes 30 are glidingly supported. Guiding rails 28, 29 are aligned in the same direction as the two lower guiding rails 11*a*, 11*b*. Upper slide 31 is glidingly supported on guiding rails 28, 29 via guiding shoes 30 in the longitudinal direction of the rails, which upper slide is also formed as a supporting plate construction and carries tool changer 33 on top plate 32 thereof.

Tool changer 33 has a narrow housing 34 in the upper part of which telescopic pipe 35 is borne which can be rotated about the longitudinal axis by a motor (not shown). Double gripper 36 is located at the free end of this telescopic pipe.

In the above-described embodiment lower plate construction 20 forms a lower slide and upper plate construction 31 forms an upper slide. The two slides together execute synchronous travel movements as will be explained in more detail below by referring to FIGS. 3*a* to 3*c*. Electric motor 40, driving two endless driving belts 41, 42 via a common driving shaft, serves as a common driving unit for lower slide 20 and upper slide 31. Upper driving belt 42 drives upper threaded spindle 44 via a pulley 43, the front end of which is supported in block 45. Threaded nut 46 of this spindle drive is fixedly connected to massive supporting plate 47 attached to plate construction 31 forming the upper slide.

Foundation 10, lower slide 20, and upper slide 31 form a supporting construction for tool gripper 36. Upper threaded spindle 44 is driven by motor 40 via toothed or driving belt 42 and pulley 43 attached to the spindle. As spindle nut 46 is rotatably supported on this upper threaded spindle , the spindle nut is displaced together with the upper slide during a rotation of threaded spindle 44 in the longitudinal direction of the spindle.

Lower spindle drive 15 is driven at nut 16 by common engine 40 via endless driving belt 41. The common drive of the two equally aligned threaded spindles 15 and 44 by only one motor 40 leads to the saving of another driving motor, to a compact constructional style due to the omission of a second drive assembly, and to a narrow width of the handling device which is of particular importance for small spaces of some complex machining centers.

FIGS. 3*a* to 3*c* show three states in the sequence of movement of the subject handling device during the transfer of a tool from the tool magazine to the work spindle by tool gripper 36. In the left end position of FIG. 3*a* a tool is taken from the magazine and in the right end position of FIG. 3*c* this tool is inserted in the work spindle 4 (FIG. 1) of the rotary swivel head of the machine (after a half rotation of tool gripper 36, not shown). The overall movement of tool gripper 36, as shown in FIGS. 3*a* to 3*c*, consists of a linear movement of lower slide 20 with the motor 40 mounted therein and a linear movement of upper slide 31 together with the tool changer 33 mounted thereon in the same direction. As can be seen from the three illustrations of FIGS. 3*a* to 3*c*, the overall movement of the tool changer 33 is performed in this embodiment in a continuous train of movement by the synchronously proceeding individual movements of the two slides.

Due to the large mass of the machining unit 3, 4 of this machine tool fast travel movements for the purpose of the tool exchanges across long distances are only possible to a limited extent. Therefore, it is more beneficial to have the tool changer execute the required travel movements because considerably fewer or smaller masses have to be moved. In the handling device according to this concept, the movement consisting of the individual movements of the lower slide and the upper slide is required because in the lower area of the machine tool only a limited path is available for a free longitudinal movement of the lower slide. This can be taken, for example, from FIG. 1 in which lower slide 20 located in its right end position abuts a left side part of machine frame 1 and for this reason cannot be moved to the right any farther. In FIG. 1 upper slide 31 with tool changer 33 is also in its right end position, as shown in FIG. 3*c*. For a tool exchange it is necessary for machining unit 3 to move a relatively short distance to the left in FIG. 1 so that the tool can engage work spindle 4 from tool gripper 36. As upper slide 31 is displaced in the same direction as the lower slide, an additional travel distance results in the upper area of the machine, which suffices to smoothly reach the exchange position of the tool gripper or the work spindle. The synchronous displacement motion of slides 20, 31 in the same direction enables a fast tool exchange.

The concept is not limited to the embodiment as shown and described above but extends to technically and functionally equivalent variants for the selective translational movement of the tool changer. For example, the two slides and the linear drives thereof may also be vertically oriented whereby vertical movements of the tool changer result. Furthermore, the travel movements of the two slides may also proceed successively in a controlled sequence, that is, with a temporal offset. In this case the lower slide adapted for longer travel paths should have finished its travel movement before the upper slide which then proceeds to move up to the exchange position of the machining head. In such a case the tool changer might be kept at stand-by, as it were, at the end of the travel path of the lower slide and only be moved into the exchange position immediately before an exchange operation by a movement of the upper slide.

What is claimed is:

1. A tool handling device for machine tools, comprising:
 a tool magazine having a transfer position for the tools;
 a tool changer having a rotatable double gripper and being movable between the transfer position and an exchange position;
 a supporting structure movable on a foundation, on which the tool changer is mounted, the supporting structure having two slides, a lower slide and an upper slide, disposed one above the other and being displaceable in a common direction;
 a respective linear drive mounted on each of the two slides; and
 a drive motor drivingly coupled to the two linear drives.

2. The tool handling device according to claim 1, wherein the two linear drives each consist of a threaded spindle and a spindle nut.

3. The tool handling device according to claim 2, wherein each respective linear drive is coupled to the drive motor via a respective belt drive.

4. The tool handling device according to claim 3, wherein the two linear drives are oriented parallel to each other and disposed at different heights in the supporting structure, thereby forming lower and upper linear drives.

5. The tool handling device according to claim 4, wherein the spindle nut of the lower linear drive is coupled via a said belt drive and the threaded spindle of the upper linear drive is coupled via a said belt drive to an output shaft of the common drive motor.

6. The tool handling device according to claim 4 wherein the supporting structure has the lower slide driven by the lower linear drive and displaceable on two guiding rails of the foundation and the upper slide displaceable on the lower slide on two other guiding rails, on which the upper slide and the tool changer, including the rotatable double gripper, is mounted, the common drive motor being provided in the lower slide.

7. The tool handling device according to claim 2, wherein the drive motor is disposed at a height in between the two threaded spindles.

8. The tool handling device according claim 7, wherein the drive motor is fixedly installed in an interior space of the lower slide.

9. The tool handling device according to claim 2, wherein the tool changer has a telescopic supporting pipe rotatably supported in a housing.

* * * * *